a high-boiling alcohol having a boiling point of at least 100° C.; and
United States Patent
Joshi et al.

(10) Patent No.: US 9,593,247 B2
(45) Date of Patent: Mar. 14, 2017

(54) COMPOSITION AND METHOD FOR REMOVAL OF ORGANIC PAINT COATINGS FROM SUBSTRATES

(71) Applicant: Atotech Deutschland GmbH, Berlin (DE)

(72) Inventors: Nayan H. Joshi, Rock Hill, SC (US); Kerri Little Carver, Fairview, NC (US); Thomas Anthony Patena, Rock Hill, SC (US); Christopher George Ringholz, Rock Hill, SC (US)

(73) Assignee: Atotech Deutschland GmbH, Berlin (DE)

( * ) Notice: Subject to any disclaimer, the term of this patent is extended or adjusted under 35 U.S.C. 154(b) by 283 days.

(21) Appl. No.: 14/355,238

(22) PCT Filed: Feb. 11, 2013

(86) PCT No.: PCT/EP2013/052678
§ 371 (c)(1),
(2) Date: Apr. 30, 2014

(87) PCT Pub. No.: WO2013/117757
PCT Pub. Date: Aug. 15, 2013

(65) Prior Publication Data
US 2014/0373878 A1    Dec. 25, 2014

(30) Foreign Application Priority Data
Feb. 10, 2012    (EP) .................................. 12154840

(51) Int. Cl.
*C11D 3/43*    (2006.01)
*C09D 9/04*    (2006.01)
*C09D 9/00*    (2006.01)

(52) U.S. Cl.
CPC ............... *C09D 9/04* (2013.01); *C09D 9/005* (2013.01)

(58) Field of Classification Search
CPC ............ C11D 3/43; C11D 7/5022; C11D 1/72
(Continued)

(56) References Cited

U.S. PATENT DOCUMENTS 5,759,980 A * 6/1998 Russo ................. C11D 11/0041
510/241
5,954,891 A * 9/1999 Kondoh .................... C11D 7/06
134/40
(Continued)

FOREIGN PATENT DOCUMENTS

CN    101758341    6/2010
DE    10258490    7/2004
(Continued)

OTHER PUBLICATIONS

Official Action for corresponding Chinese Application No. 201380004984.4 dated Jun. 20, 2016.
(Continued)

*Primary Examiner* — Gregory Webb
(74) *Attorney, Agent, or Firm* — Renner, Otto, Boisselle & Sklar, LLP

(57) ABSTRACT

The invention relates to a non-aqueous stripping composition for removing cured organic paint from substrates comprising
i. a source of hydroxide ions;
ii. a high-boiling alcohol having a boiling point of at least 100° C.; and
iii. at least one surfactant represented by the following formula R—O—(CH$_2$CH$_2$O)$_n$H and (Continued)

wherein R is an alkyl chain, linear or branched having a 2 to 24 carbon atom chain length.

18 Claims, 2 Drawing Sheets

(58) Field of Classification Search
USPC .......................................................... 510/201
See application file for complete search history.

(56) References Cited

U.S. PATENT DOCUMENTS

| | | | |
|---|---|---|---|
| 2005/0233936 A1* | 10/2005 | Dostie | C11D 1/72 510/421 |
| 2006/0089281 A1 | 4/2006 | Gibson | |
| 2006/0258555 A1 | 11/2006 | Filippini et al. | |
| 2008/0210265 A1 | 9/2008 | Crawford et al. | |
| 2009/0032069 A1* | 2/2009 | Wilson | C09D 9/04 134/38 |
| 2009/0118153 A1 | 5/2009 | Rath et al. | |
| 2010/0093596 A1* | 4/2010 | Tadrowski | C11D 1/75 510/365 |

FOREIGN PATENT DOCUMENTS

| | | | |
|---|---|---|---|
| WO | WO 2006026784 A1 * | 3/2006 | ............ C09D 9/005 |
| WO | 2011041837 | 4/2011 | |
| WO | 2011141010 | 11/2011 | |

OTHER PUBLICATIONS

PCT/EP2013/052878; PCT International Search Report and Written Opinion of the International Searching Authority dated Feb. 27, 2013.

* cited by examiner

US 9,593,247 B2

COMPOSITION AND METHOD FOR REMOVAL OF ORGANIC PAINT COATINGS FROM SUBSTRATES

The present application is a U.S. National Stage Application based on and claiming benefit and priority under 35 U.S.C. §371 of International Application No. PCT/EP2013/052678, filed 11 Feb. 2013, which in turn claims benefit of and priority to European Application No. 12154840.8, filed 10 Feb. 2012, the entirety of each of which is hereby incorporated herein by reference.

FIELD OF THE INVENTION

The present invention relates to a composition and method for removal of organic paint coatings from substrates like steel, galvanized steel, aluminium, magnesium, zinc and engineering plastics substrates. It provides a method of stripping organic coating layers from underlying substrates through the use of stripping compositions which are free of surfactants of the group of alkyl phenol ethoxylates (APE). Also, the compositions contain only small amounts of volatile organic compounds (VOC).

BACKGROUND OF THE INVENTION

There is a strong need in the industry to provide effective stripping of a variety of cured paints and powder coatings from substrates, such as steel, aluminium, galvanized steel, magnesium, engineering plastics etc. for the re-working of a part which has a flawed coating or for reclaiming parts in which the substrate is intact but which requires residues to be removed and/or new coatings to be applied. In addition to the removal of organic coatings or residues from a substrate residues such as greases, oils, mold-release coatings, polyester coatings, epoxy coatings, paints and other types of coatings, is desired.

US 2005/0079984 A1 teaches a method to strip cured paint from various substrate materials. The composition of this invention consists of a mixture of, not limited to, two surfactants selected from the group consisting; a) surfactants, non-ionic surfactants, anionic surfactants, cationic surfactants, amphoteric surfactants, acetate based surfactants, acetylene based, fluorosurfactants, solvent based surfactants, phosphate ester surfactants, acid pH based surfactants, alkaline pH based surfactants, neutral pH surfactants, sulfonic acid surfactants, phosphoric acid surfactants, fatty acid based surfactants, inorganic acid based surfactants, carboxylate based surfactants, alkylate based surfactants, alcohol based surfactants, nonylphenol surfactants, oxide-based surfactants, sulfur based surfactants, alkylphenol containing surfactants, ethoxylated surfactants, sulphonated surfactants, amine based surfactants, amide surfactants, glycol based surfactants and quaternary surfactants and surfactant blends thereof, comprising 51% to 100% of the total weight or volume of the composition, with the remaining 0.5%-49% balance consisting of additives selected by the group consisting; water, organic solvents, alcohols, aliphatic solvents, polar solvents, non-polar solvents, naphtha, oxygenated solvents, chlorinated solvents, acetones, ketones, acetates, terpene solvents, esters, acetylene solvents, glycols, ethers, propionate solvents, carbonates, aromatic solvents, kerosene, fatty acid based solvents, vegetable based solvents, acids, inorganic acids, organic acids, fatty acids, lactic acids, glycolic acids, alkaline hydroxides, alkaline silicates, phosphates, sulfates, nitrates, alkaline salts, acid salts, ethanol amines, peroxides, oxidizers, rust inhibitors, chelators, defoamers, surfactants and mixtures thereof; b) immersing said cured painted substrate in said strip tank containing said stripping composition; and c) heating said stripping composition from 65 to 180° C. for approximately 1-3 hours, wherein cured paint is removed from said substrate.

It is known that caustic compounds used at elevated temperatures in an essentially anhydrous condition are very effective in removing many types of organic coatings and residues from many types of metal substrates. One such method is taught by U.S. Pat. No. 3,790,489. However, certain metals, such as zinc, aluminum and magnesium or metallic coatings comprised of these metals or alloys thereof, as well as other metals, alloys, and even non-metallic substrates, are subject to chemical attack or destruction under such conditions as taught in the '489 patent. Thus, such caustic compositions are typically avoided in prior art teachings when removing coatings from metals, such as aluminum, magnesium and zinc.

A prior art method which avoids the use of a caustic solution is taught by U.S. Pat. No. 5,894,854. The invention relates to a method of stripping cured paint from a non-ferrous substrate comprising: a) adding a stripping composition to a strip tank, said stripping composition consisting an alkylphenol-hydroxypoly-oxyethlene and triethanolamine; b) immersing said nonferrous substrate in said strip tank containing said stripping composition; and c) heating said stripping composition to 180° C. for approximately 60 minutes, wherein cured paint is removed from said non-ferrous substrate In U.S. Pat. No. 3,954,648 is disclosed a solution with a high boiling liquid amine, and an alkali metal hydroxide. Belcak et al also suggest the use of a surface active wetting agent if needed.

U.S. Pat. No. 6,855,210 relates to a composition and method for stripping and cleaning organic coatings from substrates, comprising a solution of high-boiling alcohols, preferably polyglycols, a surfactant, preferably a nonylphenol ethoxylate, and an alkali metal hydroxide. The composition aggressively and effectively strips paints and other organic coatings without harming underlying substrates damaged by prior art strippers, over conventional or lower time periods, and at conventional or lower temperatures. One embodiment of the invention comprises from about 40% to about 98.9% by weight of a high-boiling alcohol; from about 1% to about 60% of a non-ionic surfactant; and from about 0.1% to about 10% of an alkali hydroxide or mixture of alkali hydroxides. A preferred surfactant used is based on hazardous nonylphenol ethoxylate.

Figure 1:
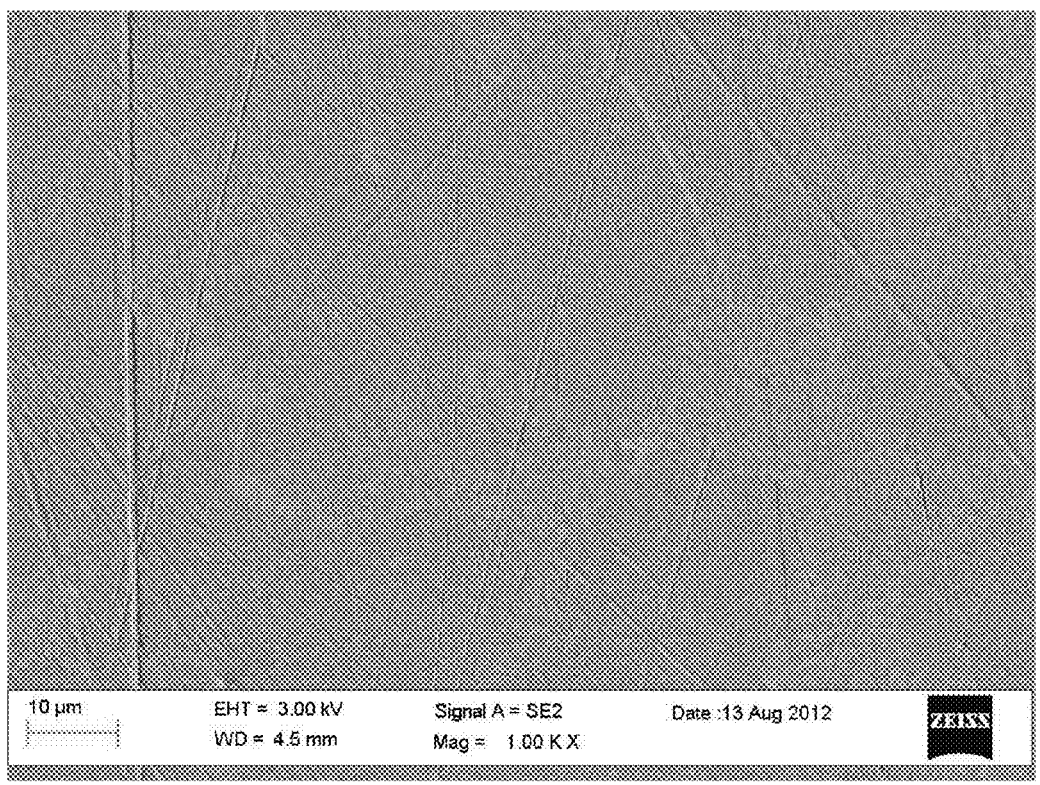
FIGS. 1 and 2 show FE-SEM micrographs of the surface after treatment in stripping compositions according to Example 7 and Example 9 (comparative).

The measurement was performed on a SIGMA VP Field Emission Scanning Electron Microscope from Carl Zeiss at 1000× magnification and at a low accelerating voltage (3 kV).

OBJECTIVE OF THE PRESENT INVENTION

It is therefore the objective of the present invention to provide effective stripping of a variety of cured paints and powder coatings from multiple substrates, such as steel, galvanized steel, aluminium, magnesium, zinc and engineering plastics substrates etc. without the use of APE and other difficult to biodegrade surfactants and additives, which cause a hazard to human and environmental safety.

It is another objective of the invention to improve the stripping performance compared to methods known in the art.

It is a further objective of the invention to extent the life time of the stripping composition.

SUMMARY OF THE INVENTION

These objectives are solved by non-aqueous stripping compositions according to claim 1 and a method for paint stripping according to claim 11.

DETAILED DESCRIPTION OF THE INVENTION

According to the present invention a composition and method of stripping organic coatings from underlying substrates is provided characterized by a stripping composition comprising the follow ingredients:
i. a source of hydroxide ions;
ii. a high-boiling alcohol having a boiling point of at least 150° C.; and
iii. at least one surfactant represented by the following formula

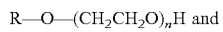R—O—(CH$_2$CH$_2$O)$_n$H and wherein R is an alkyl chain, linear or branched having a 2 to 30 carbon atom chain length.

A variety of different high-boiling alcohols can be used in the present invention. Particularly suited are alcohols having stability and flashpoints suitable with the stripping composition operating temperatures of between 100° C. and 200° C. Boiling points of the alcohols will preferably be at least 30-50° C. higher than the operating temperature. Accordingly, for safety reasons, it is desirable to have stripping mixture flashpoints at least somewhat greater than the operating temperature. Another practical concern is the mixture's vapor pressure. It cannot be too high or excessive evaporation of the mixture will occur. Good stripping results have been obtained with polyethylene glycols containing a range of between 4-100 carbon atoms, such as PEG-8. Triethylene and tetraethylene glycols, being smaller molecules than some of the higher polyglycols. Such alcohols are known from U.S. Pat. No. 6,855,210 and show good coating penetration abilities and stability and flashpoint characteristics at the preferred operation temperatures. The use of tri- and tetraethylene glycols is particularly preferred.

The alcohol or glycol content in the composition can vary, e.g. range between about 70% to about 99% by weight alcohol, with a range of about 90% to about 99% by weight being more preferred.

When using tetraethylene glycol, the stripping solution according to the present invention is preferred to have a composition range between about 40% to about 99% by weight tetraethylene glycol, with a range of about 75% to about 99% by weight being more preferred.

The composition according to the present invention preferably is essentially free of water. Some water intake may occur during operation of the stripping procedure from the atmosphere. Preferably, no water is purposely added to the composition. Generally the water content in the composition should be below 5 wt. %, preferably below 2 wt. %, more preferably below 0.5 wt. %, and even more preferred lower than 0.05 wt. %. Water in the composition does negatively effect the process performance. Usually when water is present in the composition, the stripping solution tends to show chemical attack on soft metals like aluminium and zinc.

The inventors have found that the stripping performance of the composition can be greatly improved if certain alcohol alkoxylates are used as surfactants.

This class is represented by the following formula:

R—O—(CH$_2$CH$_2$O)$_n$H and wherein R is an alkyl chain, linear or branched having a 2 to 30 carbon atom chain length.

R can also be a secondary alcohol chain residue like —CH(CH$_3$)—(CH$_2$)$_x$—CH$_3$, wherein x ranges between 5 and 15, preferably between 7 and 12.

Preferred is a composition according to the foregoing formula wherein R ranges between 8 and 14. For example, R can be selected from 2-propylheptly, n-octadecyl, n-nonadecyl, n-decadecyl, n-dodecyl, —CH$_2$—CH(C$_3$H$_9$)—(CH$_2$)$_4$—CH$_3$, —CH(CH$_3$)—(CH$_2$)$_9$—CH$_3$, —CH(CH$_3$)—(CH$_2$)$_{10}$—CH$_3$, —CH(CH$_3$)—(CH$_2$)$_{11}$—CH$_3$ and n-C12-n-C15.

Generally, the n according to the foregoing formula ranges between 2 and 100, preferably between 5 and 40 and even more preferably between 10 and 25.

A list of suitable and preferred surfactants is provided in Table 1. Such surfactants are commercially available. In Table 1 the preferred surfactants are identified by their chemical name and the CAS number.

Such surfactants show improved wettability of the substrates to be treated when compared to surfactants used according to methods of the art.

Improved wettability results in faster and more quantitative removal of the organic paint. Furthermore, the amount of surfactant in the composition can be reduced.

Compared to many surfactants of the art, which are applied in organic paint stripping compositions, the surfactants used according to the present invention are non-hazardous. The stripping compositions according to the present invention particularly are free or essentially free from APR based surfactants. APE surfactants are widely used in paint stripping operations and are for example disclosed as preferred surfactants in U.S. Pat. No. 6,855,210.

A preferred stripping composition contains between about 1% to about 20% by weight of surfactant. A preferred range for surfactant level is from about 5.0 to about 10% by weight.

One advantage of the present invention is that preferred surfactant levels are lower than those found in prior art strippers. Thus, there are fewer foaming issues to be addressed, less need for defoaming agents or other countermeasures, thereby improving the efficiencies of the stripping process.

As a source of hydroxide ions, different alkali metal hydroxides may be practiced with the present invention. It is established in the art to apply alkaline stripping solution as for example disclosed in U.S. Pat. No. 6,855,210.

A preferred source of hydroxide ions is sodium hydroxide (NaOH) or potassium hydroxide (KOH). What is important is that the stripping solution must also be being essentially free of water or having a water content low enough so the hydroxide is not ionized to an extent that it will attack zinc, aluminum or magnesium substrates. Thus, as used herein, the term "essentially free of water" means water content at a level which will not ionize the potassium hydroxide to such an extent it will attack aluminum, magnesium or zinc substrates. While NaOH or mixtures of NaOH and KOH may be used, KOH is generally preferred, as it is more easily dissolved in the stripping mixture.

The alkali metal hydroxide may be added either in solid form or as an aqueous solution hydroxide. If added in solid form, the resulting composition does not require heating to drive off any excess water. If added in aqueous liquid form, the composition may have to be heated to above the boiling point of water to drive off any excess water to restore the composition to its desired essentially anhydrous condition. Therefore, it is preferable to add the alkali metal hydroxide in solid form.

The time required in the composition varies depending upon the particular coating to or residue being treated, the thickness of the coating or residue, the potassium hydroxide content of the composition, the operating temperature of the composition, and the make-up of the carrier. This may be as little as a few minutes to as much as several hours depending upon the nature of the coating, the thickness thereof and the uniformity of the coating. When the substrate with the treated coating is removed from the bath, a post treatment, such as a water rinse or water spray, may be performed to remove any vestiges of the coating or residue left. In some cases, however, such post treatment is not necessary.

It has been found that, if the composition is maintained essentially free of water, the alkali metal hydroxide will not attack substrates that would normally be attacked by such alkali metal hydroxides when sufficient water is present to ionize the hydroxide, such as zinc, aluminum, magnesium and other such metals and alloys thereof. Thus, while the composition may be used to remove coatings on substrates other than metals which are susceptible to attack by alkali hydroxides when sufficient water is present to ionize the potassium hydroxide, it is particularly useful for removing coatings and residues from such substrates, such as aluminum, magnesium and zinc or alloys thereof, which are susceptible to such attack by potassium hydroxides without such attack occurring when the composition is maintained essentially free of water. A preferred level range of alkali metal hydroxides within a stripping solution according to the present invention is from about 0.1% to about 10% by weight, with a more preferred range of from about 0.1% to about 5% by weight. It has been found that by applying surfactants according to the present invention the amount of alkali metal hydroxide required for stripping can be reduced.

As more parts are stripped, a bath of the stripping composition will accumulate more paint and/or other coating materials dissolved. This result is an increase of viscosity of the stripping composition and lower stripping performance. However, when applying surfactants according to the present invention increase of viscosity is less of an issue as for example when applying APE based surfactants. It is believed that the surfactants according to the present invention are more effective in reducing the viscosity than hitherto used surfactants even at lower concentrations.

The composition according to the present invention should preferably be amine free in order to avoid attack of the substrate material, which particularly occurs on galvanized substrate material. Substantially free of amines shall mean that the amine content is small enough not to cause attack of the substrate material, e.g. less than 0.1 wt. %, preferred less than 0.01 wt. % and even more preferred less than 0.001 wt. %.

The temperature of the stripping composition varies between 50° C. and 250° C. and preferably ranges from 90 to 150° C.

According to the present invention, the stripping composition is preferably used in a dip or immersion process, wherein a series of parts or batches of parts are submerged into the stripping composition. Each part or batch is treated for a time sufficient to either completely strip the specific coating or loosen it enough to be rinsed off in a subsequent step.

Normally stripped paint stays in the stripping composition and accumulates in the stripper bath over time. If partially stripped part with patches of soft residues of coating are removed in the rinse step, it is possible to reduce the rate of paint accumulation in the stripper bath and extend the bath life, which is advantageous.

The stripping composition may also be sprayed onto the surface to be stripped. It may be used in combination with an immersion soak, either preceded or followed by spray application, or both.

A preferred mode of operation to strip the coating comprises the following steps:
  i. providing aforementioned stripping composition according in a tank device;
  ii. bringing into contact the aluminium, steel, galvanized steel, magnesium, zinc or plastic based substrates with the stripping composition in the tank device;
  iii. heating said stripping composition to a temperature of between 50 and 250° C. for a period of between 30 and 300 minutes and thereby removing or loosening the cured organic paint from the aluminium, steel, galvanized steel, magnesium, zinc or plastic based substrates;
  iv. completely remove the organic paint from the substrate by applying a high pressure water spray to the substrate surface.

The high pressure water spray applied in step iv) generally has a pressure of between 50 and 250 bar.

The present invention is appropriate for use on steel (both with and without a galvanized Zn layer), roll-formed steel, zinc die-cast products, aluminum, aluminum die-cast products, brass, bronze, copper, titanium, magnesium, plated substrates, and non-metallic substrates, such as plastics. Typical automotive components stripped include exterior sheet metal components, aluminum wheels and plastic headlight housings. Non-automotive components include architectural hardware, lighting components, plumbing fixtures and electronics housings. The preferred application of the stripping solution and method of the present invention is the stripping of organic-based systems.

These include: electro-deposition coatings, powder coatings (acrylics, polyesters, TGIC, epoxies, urethanes, and hybrid formulations), primer coatings (acrylics, epoxies, and urethanes), solvent-based and water-based organic coatings (primarily acrylics, urethanes and epoxies), and one and two component clearcoat technologies (primarily acrylic and urethane formulas). Certain enamels and lacquer coatings can also be removed. An exemplary list of the types of common coatings that may be stripped according to the present invention includes: Cathodic electrocoats (both lead and non-lead types); Powder primers (polyester, hybrids and acrylic types); Powder monocoats; Liquid monocoats; Liquid solvent basecoats; and Liquid one and two component acrylic clearcoats. Composite coatings with multiple layers may also be successfully stripped. An exemplary list includes: An epoxy coat ("Ecoat") with an upper powdercoat; An Ecoat, basecoat, clearcoat composite paint; An Ecoat, monocoat composite paint; and An Ecoat, primer, basecoat, clearcoat composite paint.

The following non-limiting examples are provided to demonstrate certain embodiments of the present invention.

For the examples stripping performance for the following organic coatings habe been tested: Epoxy-; Epoxy-polyester hybrid-; Polyester-; Triglycidyliso-cyanurate (TGIC)-; Urethane-; 2-part Epoxy paint-organic coatings.

Example 1

To check the effectiveness of high boiling point glycol for the removal of cured polymer coating, tetraethylene glycol (boiling point of 324° C.) was tested with and without alkali metal hydroxide. A composition containing 1.5% by wt. KOH was used in one of the stripping compositions, the remainder being tetraethylene glycol. Both the solutions were heated at 150° C. and TGIC-coated steel panes were immersed in both the solutions. Good agitation was maintained in both the condition by mechanical stirrer. Coating on the test panel in the solution with KOH was almost stripped off in about 45 minutes except very little paint residues stayed behind on the substrate. The panel in the solution without KOH essentially containing tetraethylene glycol only was remained unstripped.

Example 2

Two stripping compositions based on tetraethylene glycol and KOH, as described in Example 1, embodiment with hydroxide, were tested with two different surfactants. In one composition, 2.5% by wt. nonyl phenol ethoxylate (NPE) was used (comparative). In another case, surfactant No. 1 (Table 1), POLYETHYLENE GLYCOL TRIMETHYL-NONYL ETHER was used at 2.5% by wt. level. Both stripping compositions were evaluated using the same condition described in Example 1 and TGIC powder coated panels were used. The coated panel was completely stripped off in 30 minutes in the NPE based composition. The same panel having the same organic coating could be completely stripped in only 22 minutes under the same operating conditions. This establishes the increased efficiency of the surfactants according to the present invention compared with surfactants according to the prior art.

Example 3

Several commercially available surfactants, based on alcohol ethoxylates were evaluated for its wetting and stability in high temperature paint stripping application. From the results, surfactants based on alcohol ethoxylates showed good wetting and stability along with a high degree of solubility in glycol based system. Such surfactants are suitable for stripping compositions according to the present invention.

TABLE 1

Preferred surfactants according to the present invention

| No. | CAS No. | Chemical Name | Results |
|---|---|---|---|
| 1 | 68131-40-8 | POLYETHYLENE GLYCOL TRIMETHYLNONYL ETHER | Improved wetting Good solubility |
| 2 | 68551-13-3 | ALCOHOLS, C12-15 ETHOXYLATED PROPOXYLATED | Improved wetting Good solubility |
| 3 | 68987-81-5 | Alcohols, C6-10, ethoxylated, propoxylated | Improved wetting Good solubility |
| 4 | 37251-67-5 | Polyethylene Glycol Monodecyl Ether | Improved wetting Good solubility |
| 5 | 882035-52-1 | Ethoxylated C10 guerbet alcohol | Improved wetting Good solubility |
| 6 | 160875-66-1 | Poly(ethylene oxide) mono-2-propylheptyl ether | Improved wetting Good solubility |
| 7 | 71060-57-6 | Ethoxylated C8-10 alcohols | Improved wetting Good solubility |

Example 4

For side by side comparison of APE based surfactant and APE free surfactant based stripper compositions, two paint stripper compositions were prepared using following compositions:

1. NPE Based Composition (Comparative)—Solution #1
   Tetraethylene Glycol (88% by wt.)
   Surfonic N-60 (10% by wt.), available from Huntsman International, an ethoxylated nonylphenol
   Potassium Hydroxide 45% solution (2% by wt.)
2. NPE-Free Composition (According to the Invention)—Solution #2
   Tetraethylene Glycol (93.5% by wt.)
   Surfactant No. 1 (Table 1), POLYETHYLENE GLYCOL TRIMETHYLNONYL ETHER (4.5% by wt.)
   Potassium Hydroxide 45% solution (2% by wt.)
   The above compositions were tested for over three week period and processed total throughput >30 sq.ft./gal. A variety of painted and powder coated steel and aluminium panels were stripped during the test period. Both the solutions were checked daily for its viscosity and alkalinity. Alkalinity was adjusted back to the initial level by addition of calculated amount of solid KOH. Viscosity measurement was done using a FORD cup at the temperature of 45° C. Detail of test results is in following table:

TABLE 2

Experimental results of viscosity testing

| Solution | Total Grams KOH Added Grams | Initial Viscosity Ford Cup #4 At 45° C. | Final Viscosity Ford Cup #4 At 45° C. | Throughput Sq. Ft./Gal (Total) |
|---|---|---|---|---|
| #1 | 135.81 | 18.68 seconds | 64.63 seconds | 32.02 |
| #2 | 126.39 | 18.49 seconds | 62.73 seconds | 32.08 |

The Ford viscosity cup is a gravity device that permits the timed flow of a known volume of liquid passing through an orifice located at the bottom. Under ideal conditions, this rate of flow would be proportional to the kinematic viscosity (expressed in stokes and centistokes) that is dependent upon the specific gravity of the draining liquid. It is a simple and commonly used device for low to mid solid paints/coatings of viscosity range of 20-250 centistokes. Viscosity can be found from conversion table using drain time in seconds at given temperature. Longer drain time means higher viscosity.

In the above example, solution #2 shows shorter drain time, means lower viscosity after processing the same throughput/work load, which indicates the surfactant used in solution #2 is more effective to control the increase in viscosity of paint stripper solution.

Example 5

In a separate test, glycol based paint stripping compositions were tested using different alkali metal hydroxides. Tetraethylene glycol was selected as solvent, Surfactant No. 1 (Table 1), POLYETHYLENE GLYCOL TRIMETHYL-NONYL ETHER was used as surfactant at 5% by wt. level and sodium hydroxide, potassium hydroxide, and lithium hydroxide were used as source of alkalinity (concentration each of 0.15 mol/l).

These three compositions were tested for stripping of Polyester TGIC powder coated test panels. In stripping performance, sodium and potassium hydroxide based compositions showed similar coating stripping performance. The panels could be completely stripped within 8 minutes at 145° C., while the stripping time in lithium hydroxide based composition was about 50% longer than the sodium and potassium hydroxide based compositions.

Example 6

A stripping composition with 92 wt. % tetraethylene glycol, 3 wt. % potassium hydroxide solution (45 wt. %) and 5 wt. % of polyoxyethylene alkyl (C13) ether surfactant, CAS 84133-50-6, was tested for stripping epoxy e-coat. A steel part coated with e-coat was stripped in the stripping solution at a temperature of 150° C. followed by spray rinsing for 3 minutes. All the coating was completely removed in 20 minutes.

Example 7

Stripper composition described in Example 6 was used to strip off polyester paint over aluminum substrate.

The material used in the present investigation was aluminum casting alloy A356. Alloy A356 belongs to the hypo eutectic Al—Si alloys and has a wide field of application in the automotive and aerospace industries. A356 is comprised of 7Si, 0.3 Mg, 0.2 Fe (max) and 0.10 Zn (max).

The painted part was stripped at 150° C. for 60 minutes followed by spray rinse for 3 minutes. All the paint was completely removed leaving a clean, bright aluminum surface without any chemical attack of base substrate.

FIG. 1 shows an FE-SEM micrograph of the surface after treatment. It can be seen that the surface is preserved and no etching occurs, which is desired.

In Table 3, the Ra values before and after stripping are given. The roughness of the samples stripped according to Example 7 is unchanged as compared to a polished sample that has not been stripped.

TABLE 3

Roughness measurements (Ra, arithmetic mean roughness) from a stylus profilometer (Mitutoyo Suftest-501) on the aluminum panel pieces polished and then stripped

| Stripping Technology | Ra (μm) |
| --- | --- |
| Control (no stripping) | 0.080 ± 0.005 |
| Example 9 | 2.0 ± 0.2 |
| Example 7 | 0.080 ± 0.005 |

Example 8

Stripper composition described in Example 6 was also tested for stripping of an aluminum part coated with acrylic wet paint. The part was stripped at 150° C. for 30 minutes followed by spray rinsing for 3 minutes. Complete removal of coating was observed without any sign of chemical attack on aluminum substrate.

Example 9 (Comparative)

The aluminium workpiece according to example 6 was a stripped in a composition standardly used in the industry consisting of concentrated hot sulphuric acid at a temperature of 60° C., the treatment time was 30 minutes.

Figure 2:
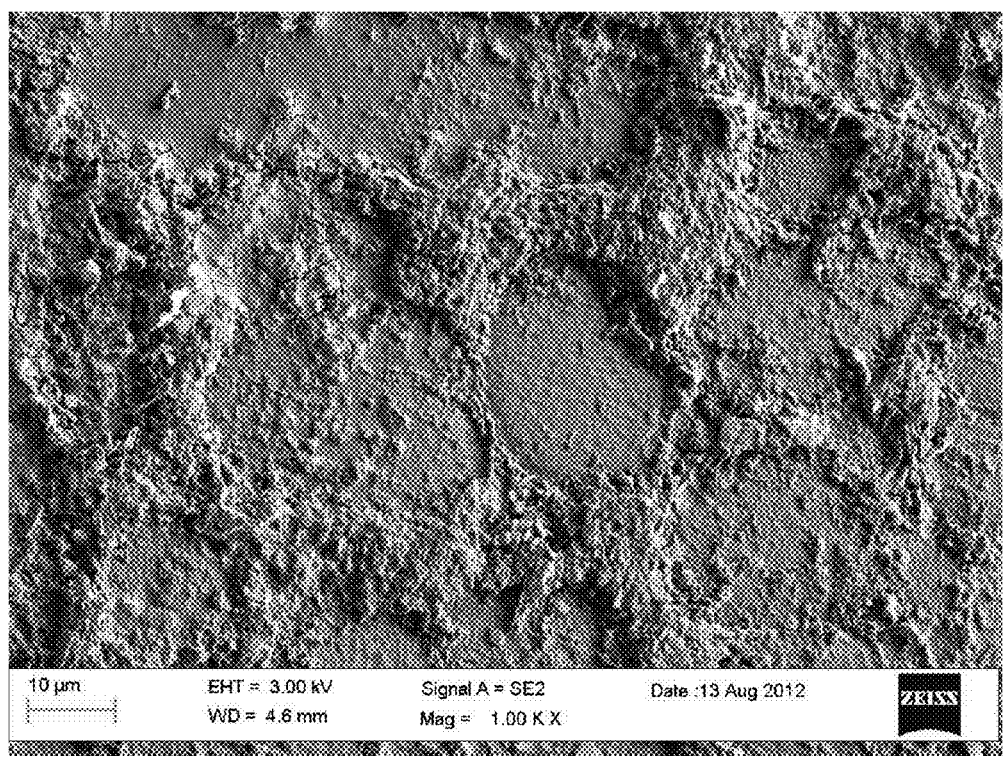

FIG. 2 shows an FE-SEM micrograph of the surface after treatment. It can be seen that the surface appearance is dramatically changed showing extensive etching and high roughness, both of which is undesired.

Treatment according to Example 9 did dramatically increase the surface roughness (Table 3) and negatively affects of the quality of the stripped workpiece.

The invention claimed is:

1. Non-aqueous stripping composition for removing cured organic paint from substrates comprising
   i. a source of hydroxide ions;
   ii. a high-boiling alcohol having a boiling point of at least 150° C.; and
   iii. at least one surfactant represented by the following formula R—O—(CH$_2$CH$_2$O)$_n$H and 

wherein R is an alkyl chain, linear or branched having a 2 to 30 carbon atom chain length, and n ranges between 2 and 100,
   wherein the composition is essentially free of added water and
   wherein the high-boiling alcohol is at a concentration in the range from 70 to 99 wt % of the composition.

2. Composition according to claim 1 wherein the substrate is aluminium, steel, galvanized steel, magnesium, zinc and engineering plastic.

3. Composition according to claim 1 wherein R ranges between 8 and 14.

4. Composition according to claim 1 wherein R is selected from 2-propylheptly, n-octadecyl, n-nonadecyl, n-decadecyl, n-dodecyl, —CH$_2$—CH(C$_3$H$_9$)—(CH$_2$)$_4$—CH$_3$, —CH(CH$_3$)—(CH$_2$)$_9$—CH$_3$, —CH(CH$_3$)—(CH$_2$)$_{10}$—CH$_3$, —CH(CH$_3$)—(CH$_2$)$_{11}$—CH$_3$ and n-C$_{12}$-n-C$_{15}$.

5. Composition according to claim 1 wherein n ranges between 6 and 25.

6. Composition according to claim 1 wherein the source of hydroxide is an alkali metal hydroxide having a concentration of 1 to 10 wt. %.

7. Composition according to claim 1 wherein the alkali metal hydroxide is sodium or potassium hydroxide.

8. Composition according to claim 1 wherein the high boiling alcohol is a polyethylene glycol.

9. Composition according to claim 8 wherein the polyethylene glycol is a triethylene glycol or tetraethylene glycol.

10. Composition according to claim 1 wherein the composition is essentially free of alkoxylated alkylphenol surfactants.

11. Composition according to claim 1 wherein the composition is essentially free of amines.

12. Composition according to claim 1 wherein the water content in the composition is less than 2 wt. %.

13. Composition according to claim 1 wherein the water content in the composition is less than 0.5 wt. %.

14. Composition according to claim 1 wherein the alcohol content ranges between 90 wt. % to 99 wt. %.

15. A method for stripping cured organic paint from the aluminium, steel, galvanized steel, magnesium, or plastic based substrates comprising the steps of
   i. providing a stripping composition according to claim 1 in a tank device;
   ii. bringing into contact the aluminium, steel, galvanized steel, magnesium, or plastic based substrates with the stripping composition in the tank device;
   iii. heating said stripping composition to a temperature of between 50 and 250° C. for a period of between 30 and 300 minutes and thereby removing or loosening the cured organic paint from the aluminium, steel, galvanized steel, magnesium, zinc or plastic based substrates
   iv. completely removing the organic paint from the substrate by applying a high pressure water spray to the substrate surface.

16. Method according to claim 15 wherein the water spray applied in step iv. has a pressure of between 50 and 250 bar.

17. Method according to claim 15 wherein the temperature ranges between 100 and 150° C. and the treatment time between 45 to 100 minutes.

18. Method according to claim 15 wherein the cured organic paint is a polyester powder coating, a 2-part epoxy coating, a epoxy-polyester hybrid powder coating or a polyester-TGIC powder coating.

* * * * *